United States Patent
LaBaw

[15] 3,678,283
[45] July 18, 1972

[54] RADIATION SENSITIVE OPTICAL TRACKER

[72] Inventor: Kenneth B. LaBaw, China Lake, Calif.

[73] Assignee: The United States of America as represented by the Secretary of the Navy

[22] Filed: Oct. 22, 1970

[21] Appl. No.: 82,880

[52] U.S. Cl.............................250/216, 250/203, 356/152
[51] Int. Cl.............................................................H01j 3/14
[58] Field of Search..................250/221, 272, 216, 203, 215, 250/217; 356/152, 172, 138

[56] References Cited

UNITED STATES PATENTS

| | | | |
|---|---|---|---|
| 3,365,572 | 1/1968 | Strauss | 250/222 X |
| 3,375,375 | 3/1968 | Abbey et al | 356/152 X |
| 3,432,671 | 3/1969 | Edmonds | 250/216 X |
| 3,452,204 | 6/1969 | Love et al | 317/235 UA X |
| 3,435,232 | 3/1969 | Sorensen | 250/211 J |

Primary Examiner—Walter Stolwein
Attorney—R. S. Sciascia and Roy Miller

[57] ABSTRACT

An optical tracker system for determining the sight-line of a pilot within a cockpit. The system has at least two light sources and one photodetector mounted in the cockpit, and one light source and one photodetector mounted on the pilot's helmet. Electrical signals from the photodetectors uniquely establish the position and orientation of the pilot's helmet. When a helmet attached sight is included in the system the signals indicate the pilot's line-of-sight.

10 Claims, 3 Drawing Figures

PATENTED JUL 18 1972  3,678,283

INVENTOR.
KENNETH B. LABAW
BY ROY MILLER
ATTORNEY.

RADIATION SENSITIVE OPTICAL TRACKER

GOVERNMENT INTEREST

The invention described herein may be manufactured and used by or for the Government of the United States of America for governmental purposes without the payment of any royalties thereon or therefor.

BACKGROUND OF THE INVENTION

In the field of search systems the aircraft pilot has not been used to his full capabilities. An objection commonly raised by pilots is that they can scan the terrain but have very limited techniques for directing a tracking system, for example, to a detected object. The pilot can point avionic systems only with his aircraft. If he could point a tracking system, for instance, off aircraft boresight his flight path selection could be more flexible. Heretofore, the imposing restriction has been the pilot's inability to communicate direction to on-board systems and other on-board personnel.

Given that the pilot has a sight on his helmet that is independent of eye movement, then the problem of communicating direction narrows to one of tracking his helmet. That is, sensing the aim direction of the helmet. Important considerations, other than accuracy, for any helmet tracking scheme are: pilot's safety and comfort, and cockpit space. Pilot safety and comfort impose restrictions in helmet weight, mechanical connections to the helmet, and fracturable materials near the eyes. Cockpit space restricts the use of mechanical linkage and optical levers. Of course, in any design the pilot's vision should not be obstructed by objects on the helmet or in the cockpit.

SUMMARY OF THE INVENTION

The present invention is an optical tracker system for tracking an object such as a pilot's helmet. The system has at least one photodetector assembly and one light source located on the object, and two light sources and one photodetector assembly spatially fixed in the system environment. The angles to the plurality of said fixed light sources measured by the photodetector assembly or assemblies on the object are functions of both the objects orientation and location. The angles describing the objects location, including its attached light source, is measured by said fixed photodetector assembly or assemblies. In the case of an aircraft, the fixed detector can locate the pilot's helmet with respect to a reference, such as the aircraft boresight. The azimuth and elevation angle of the pilot's line-of-sight with respect to the aircraft boresight can be calculated independently of the helmet position within the cockpit.

Some of the advantages of the present invention are: There are no moving parts except, of course, the pilot's helmet. The detectors measure the centroid of the image of the light source, therefore tracking accuracy is not degraded by defocusing as the pilot moves his head. The sources are solid state light emitting diodes, and are therefore small and without filaments. The optical fields of view are not scanned, and the angular information output is continuous allowing direction sampling at any time and at high repetition rates.

FIG. is a schematic of the angles measured by the present invention; and

Figure 3:
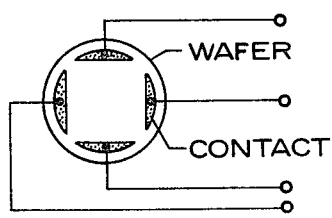

FIG. 3 is a schematic of one type of lateral photodetector which can be used in the preferred embodiment of the invention.

DESCRIPTION OF THE PREFERRED EMBODIMENT

Figure 1:
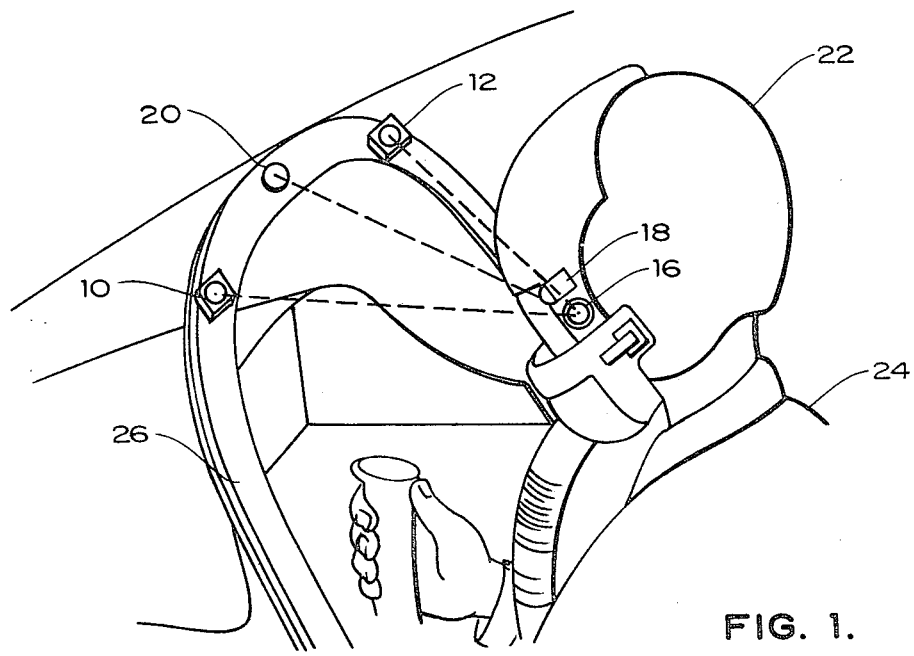
FIG. 1 is a plan view of the present invention being utilized in an aircraft cockpit.

Referring to FIG. 1, the preferred embodiment of the tracker system having illuminaters 10, 12 and 18; and detector assemblies 16 and 20 is shown. If an aircraft pilot has a sight on his helmet that is independent of eye movement, such as the sight disclosed in patent application Ser. No. 53,724 by Reed A. Farrar, filed July 10, 1970; a system which measures the location and orientation of the helmet 22 with respect to a reference point in the cockpit thereby defines the pilot's line-of-sight. Prior to the present invention the problem was to measure the helmet's orientation and location. The present invention solves that problem. Detector assemblies 16 and 20 include imaging optics and lateral photodetectors. A lateral photodetector (FIG. 3) is often constructed by depositing a thin layer of metal onto one face of a wafer silicon. The metal layer is thick enough to be electrically conductive but thin enough to be optically transparent. The interface between the silicon and the metal is a Schottky barrier. Ohmic contacts are placed on the backside in a square or similar configuration. Light entering the metal layer is detected, causing current to flow to the contacts. It is the path differences to the contacts that causes different outputs from each contact. Thus, current differences at the contacts are functions of the lateral position of the light spot. Although the amount of current at each contact is proportional to the intensity of the light, its proportion to the total current is independent of light intensity.

It has been determined by experimentation that this type of detector has its maximum sensitivity in the infrared range. Therefore, Gallium Arsenide (GaAs) light emitting diodes can be used as illuminators 10, 12 and 18. These diodes emit light at 0.9 microns (9,000 A) in a narrow spectral band very near the lateral photodetectors peak response, thereby providing spectral discrimination against background sources. Additionally, light emitters 10, 12 and 18 can be amplitude modulated at high frequencies to provide discrimination against background sources that are modulated by aircraft or pilot motions.

The angles that uniquely establish the pilot's sight line with respect to a line from the helmet to a reference point in the cockpit can be measured by one small photodetector assembly 16 located on the helmet 22 and two light emitters 10 and 12 mounted at any convenient location in the cockpit. The light emitters, of course, must be within the detectors field of view. Equally spacing the light emitters on either side of the boresight line in front of the pilot, such as on the arched structure 26 which meets the wind screen and canopy on most modern aircraft, maximizes accuracy over the sighting angle envelope. Two cockpit mounted light emitters 10 and 12 are required since the pilot 24 is capable of rolling his head about his line of sight. Given the relative position of the two light emitters 10 and 12, the amount of roll can be computed from the photodetectors outputs.

Since the angles measured by the photodetector assembly 16 on the helmet 22 are functions of both the pilot's line of sight and the helmet's location within the cockpit, it remains then to measure the location of the helmet. The angle describing the helmet location can be measured by placing a photodetector assembly 20 at a reference point in the cockpit and an illuminator 18 on the helmet. Only one light emitter is required on the helmet 22 since photodetector assembly 20 is fixed with respect to the aircraft. The output of photodetector assembly 20 can be used to locate the helmet 22 with respect to the aircraft boresight. The azimuth and elevation angles of the pilot's line of sight with respect to the aircraft boresight can be determined irrespective of the helmet position within the cockpit. Alternatively, direction cosines can be produced.

Photodetector assembly 16 and light emitter 18 can be mounted at any convenient location on the pilot's helmet. As shown in FIG. 1, the photodetector assembly-light emitter pair is mounted on the temple area of helmet 22. In such a case, a second photodetector assembly-light emitter pair can be mounted on the other temple area. Using such a configuration, one pair would be used when the pilot looks to the right and the other pair would be used when the pilot looks to the left.

Improved operation results when selective designing is conducted on the lens which images the light onto the photodetector of each photodetector assembly. Since the output of existing lateral photodetectors is nonlinear, it is possible to improve rectilinearity by selecting a complimentary lens to match the lateral photodetector. That is, since a lens diffracts light, a lens having a particular diffraction characteristic can be chosen to compliment the nonlinearity of a particular lateral photodetector to achieve rectilinear outputs.

Figure 2:
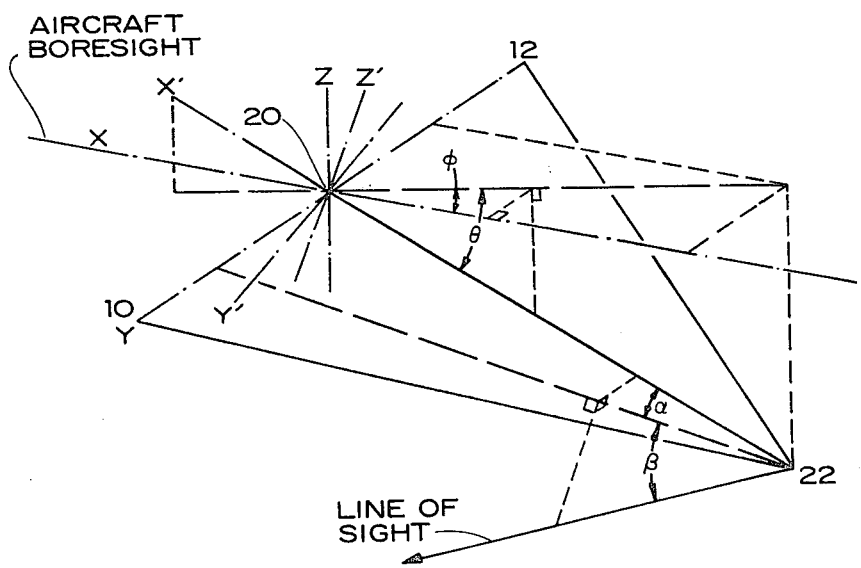

Referring now to FIG. 2, the angles measured by the outputs of lateral photodetector assemblies defining the pilot's line of sight are $\alpha$, $\beta$, $\theta$, and $\phi$. The angles are measured in the helmet's coordinant system $(x^1, y^1, z^1)$ the information must be translated to the aircraft coordinant system $(x, y, z)$ to be of value to on-board systems or personnel. The transformation equations are:

$$\theta_F = \sin^{-1}\left[\frac{-\sin\theta\cos\alpha\cos\beta + \cos\theta(\sin\phi\sin\theta\sin\alpha\cos\beta + \cos\phi\sin\beta)}{(1-\cos^2\theta\sin^2\phi)^{1/2}}\right]$$

$$\phi_F = \sin^{-1}\left[\frac{\cos\theta\sin\phi\cos\alpha\cos\beta + (1-\cos^2\theta\sin^2\phi)^{1/2}\sin\alpha\cos\beta}{\cos\theta_F}\right]$$

Where $\phi$ and $\theta$ are azimuth and elevation of the helmet in the aircraft system, $\alpha$ and $\beta$ are azimuth and elevation of the line of sight in the helmet system, and $\phi_F$ and $\theta_F$ are azimuth and elevation of the line of sight in the aircraft system.

The operation is as follows: two light emitters 10 and 12 mounted in the cockpit illuminate a lateral photodetector assembly 16; and a light emitter 18 illuminates a lateral photodetector assembly 20 mounted at a reference point. Lateral photodetector assemblies 16 and 20, which detect the centroid of the image of each light emitter, provide outputs which describe the pilot's helmet location and orientation, and therefore his line of sight.

A feedback system can be utilized so that the radiation level at the detectors remains constant even when the distance between the source and the detector is varied. An antireflective coating and/or filter can be applied to the detectors for improved results. And further, the spectral response of the detectors themselves can be controlled, such as by applying coupling methods to the focussing optics for the illuminators.

What is claimed is:

1. An optical tracker system for determining the position and orientation of an object comprising:
    first detection means coupled to said object for movement therewith, for providing a first output when illuminated;
    first illumination means system spatially fixed at a distance from said object for illuminating said first detection means;
    second detection means system spatially fixed at a distance from said object for providing a second output when illuminated; and
    second illumination means coupled to said object for movement therewith, wherein said second illumination means is coupled so as to illuminate said second detection means;
    such that said first and second outputs indicate the position and orientation of said object.

2. The system of claim 1 wherein each of said first and second detection means includes a lateral photodetector.

3. The system of claim 2 wherein;
    each of said first and second detection means further includes imaging optics, and each of said first and second illumination means includes a Gallium Arsenide light emitting diode.

4. The system of claim 1 wherein said second detection means comprises a plurality of lateral photodetectors.

5. The system of claim 1 wherein:
    said first detection means comprises a plurality of lateral photodetectors, and imaging optics for each said lateral photodetector; and
    said second illumination means comprises a plurality of light emitting diodes;
    wherein one of said lateral photodetectors is mounted adjacent each of said light emitting diodes to form a plurality of detector-diode pairs, and said light emitting diodes are mounted such that one of said plurality of lateral photodetectors will be illuminated by said first illumination means, and one of said plurality of light emitting diodes will illuminate said second detection means when the object is at any position and orientation within the system space.

6. An optical tracker system for determing the sight line of the operator comprising:
    a sight coupled to the operator's head such that when said operator superimposes his view of said sight on his view of an object the position and orientation of his head defines the said sight line;
    first detection means coupled to said operator's head for movement therewith, for providing a first output when illuminated;
    first illumination means system spatially fixed at a distance from said operator's head for illuminating said first detection means;
    second detection means system spatially fixed at a distance from said operator's head for providing a second output when illuminated; and
    second illumination means coupled to said operator's head for movement therewith, wherein said second illumination means is coupled so as to illuminate said second detection means;
    such that said first and second outputs indicate the sight line of said operator.

7. The system of claim 6 wherein each of said first and second detection means includes a lateral photodetector.

8. The system of claim 7 wherein;
    each of said first and second detection means further includes imaging optics, and each of said first and second illumination means includes a Gallium Arsenide light emitting diode.

9. The system of claim 6 wherein said second detection means comprises a plurality of lateral photodetectors.

10. The system of claim 6 wherein:
    said first detection means comprises a plurality of lateral photodetectors, and imaging optics for each said lateral photodetector; and
    said second illumination means comprises a plurality of light emitting diodes;
    wherein one of said lateral photodetectors is mounted adjacent each of said light emitting diodes to form a plurality of detector-diode pairs, and said light emitting diodes are mounted such that one of said plurality of lateral photodetectors will be illuminated by said first illumination means, and one of said plurality of light emitting diodes will illuminate said second detection means when the operator's head is at any position and orientation within the field of the system.

* * * * *